1,924,689

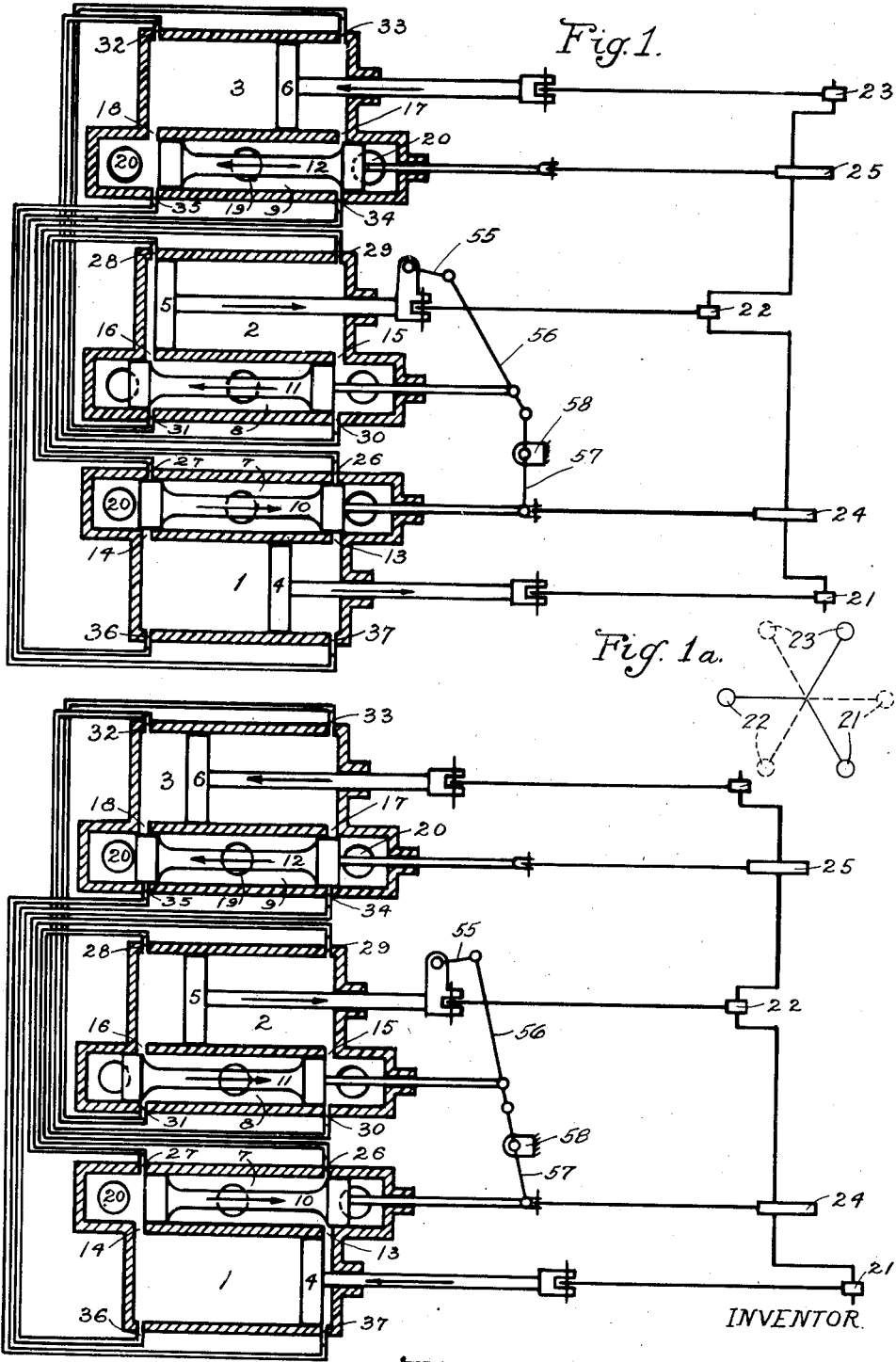

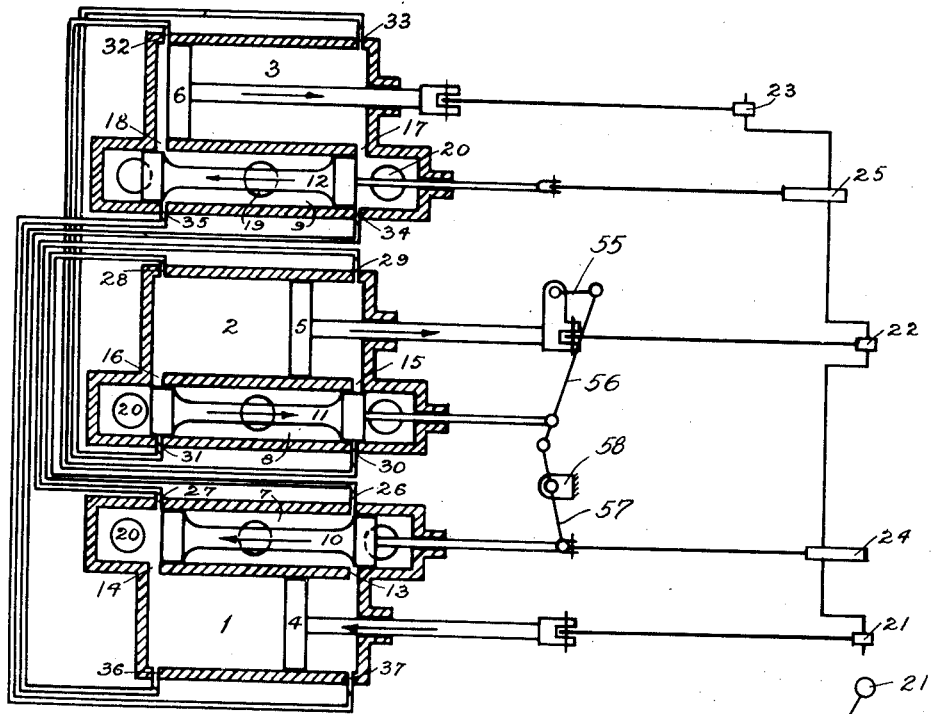
Fig. 3. 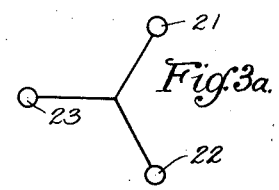 Fig. 3a.
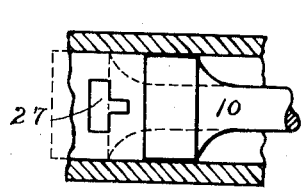 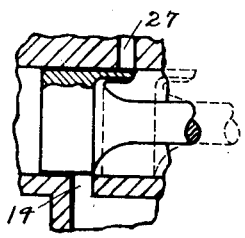 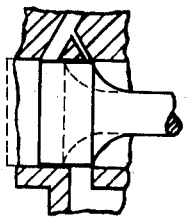
Fig. 4.   Fig. 5.   Fig. 6.
INVENTOR.
Ronald F. Knight Aug. 29, 1933.  R. F. KNIGHT  1,924,689
STEAM ENGINE
Filed Oct. 8, 1930  3 Sheets-Sheet 3
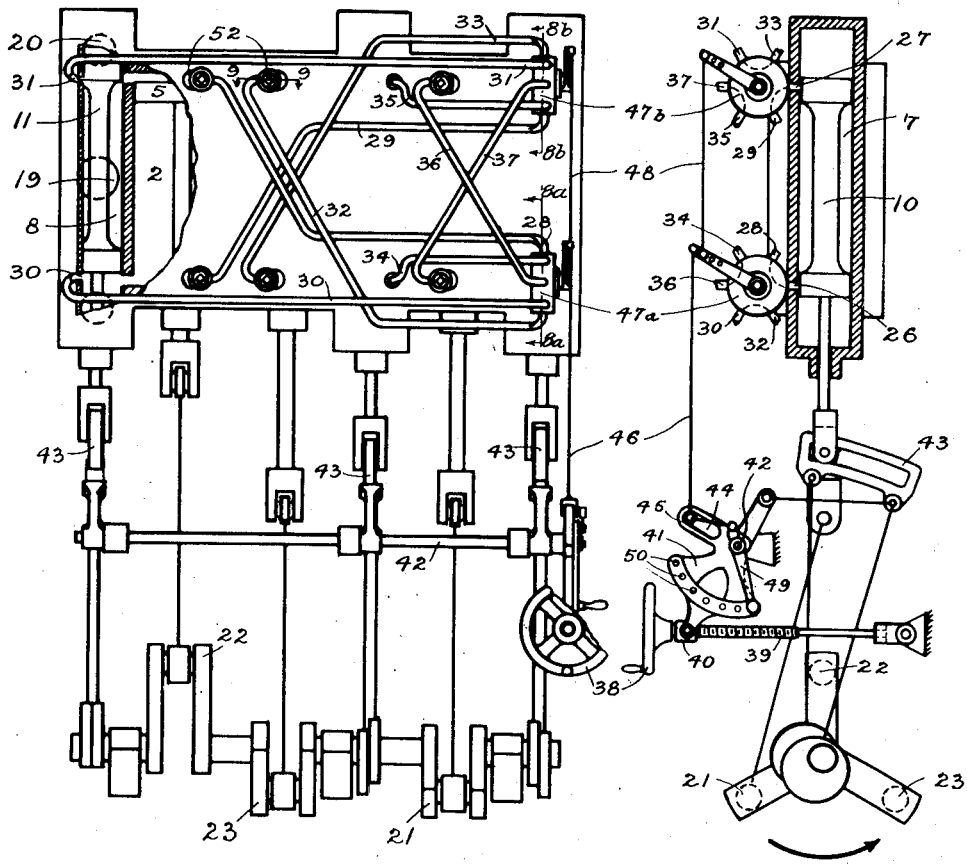
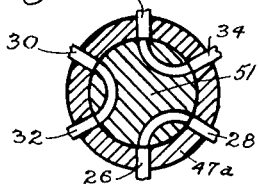
Fig. 7b.
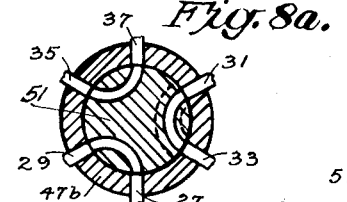
Fig. 9.
INVENTOR.
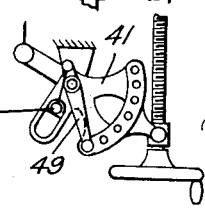
Ronald F. Knight Patented Aug. 29, 1933

UNITED STATES PATENT OFFICE 1,924,689

STEAM ENGINE

Ronald Frank Knight, Ramsey, N. J.

Application October 8, 1930. Serial No. 487,233

17 Claims. (Cl. 121—122)

This invention relates to engines operated by steam, compressed air or other expansible fluid, and has for its object the provision of means whereby such an engine can start and operate at slow speed, a given maximum load with a smaller quantity of the motive fluid than is required by single expansion engines of conventional type, and also exert at high speed a much larger proportion of its maximum rotative effort than has been found to be practical with the ordinary engine. Other new and useful advantages resulting from the employment of the principle involved in this invention will become apparent upon perusal and study of this specification and the accompanying drawings, in which Fig. 1 shows in skeleton and diagram form the principle and concerned features of an engine embracing this invention; Fig. 1a is a diagram showing the relative positions of the cranks of Fig. 1 by full lines and those of Fig. 2 by dotted lines; Fig. 2 shows the same machine and the relative position of the chiefly concerned parts after a partial revolution of the crankshaft, and Fig. 3 shows the results of a further partial revolution of the crankshaft. Fig. 3a is a diagram showing the relative positions of the cranks of Fig. 3. Fig. 4 shows an enlarged view of auxiliary port 27 and the extreme positions of its control valve. Fig. 5 indicates the relative positions of main and auxiliary ports when the latter is not to be used for exhaust purposes. Fig. 6 shows the form and relative positions of main and auxiliary ports when it is desired to make extended use of the auxiliary port for exhaust purposes, combined with a small auxiliary port area for live steam passage. Fig. 7 illustrates in skeleton and diagram form, a front view, partly sectional, of a vertical reversible engine embodying the principle of this invention. Fig. 7a is a view of the right hand end of Fig. 7, with the valve chest at that end in section. Fig. 7b is a partial view of Fig. 7a but showing the positions of the concerned parts when lever 49 is moved to the extreme position opposite that which it occupies in Fig. 7a. Fig. 8 views (a) and (b) are enlarged diagrammatic sectional views of the selecting valves taken at lines 8a—8a and 8b—8b respectively in Fig. 7. Fig. 9 is a section through fitting 52, taken at line 9—9 in Fig. 7 and exemplifies means for readily applying and maintaining in proper condition the desired controlling area for an auxiliary passage, as hereafter to be explained.

Referring now more particularly to the drawings;

Fig. 1. Cylinders 1, 2 and 3, respectively contain pistons 4, 5 and 6, whose direction of movement at the moment is indicated by the arrows seen on their respective pistons rods. Each cylinder is provided with a valve chamber 7, 8 and 9 respectively, in which operate valves 10, 11 and 12, and their direction of movement at the same moment is also shown by the arrows seen upon them. These valves open and close the main ports 13, 14; 15, 16; and 17, 18; respectively by means of which the motive fluid enters either end of the cylinders from the supply port 19, and leaves for the exhaust ports 20 in the usual manner. Pistons 4, 5 and 6 are connected with and actuate cranks 21, 22 and 23 respectively which are here arranged 120 degrees apart, as seen by the full lines of Fig. 1a. Eccentrics 24 and 25 respectively operate in the usual way valves 10 and 12, valve 11 is actuated by the system of levers seen, in which, combination lever 56, to which the valve is connected, receives motion from the crosshead of piston 5 to which it is connected by union link 55, and also from rocking lever 57 which is pivoted at 58 and connected to and operated by the rod of valve 10 as seen, thus combining the motion of valve 10 with that of piston 5 to produce an action for valve 11 similar to that of valves 10 and 12. It is seen therefor that, so far as has been described, the general relative co-operation of each piston and its valve is conventional, the steam entering and leaving the cylinders in the usual way. In the arrangement illustrated each cylinder has a cut-off (fixed) of approximately 30% stroke. An engine constructed as above would, according to calculation by usual formula, exert on the crankshaft at very slow speed a mean rotative effort of about 1.2 times the initial pressure on one piston. Let it be here recalled, that to start under load, an engine must have at least two cylinders, hence the conventional two-cylindered engine operating cranks set at right angles to each other. To enable such an engine to exert when starting, as large a proportion of its mean slow speed rotative effort as possible, it is necessary, as is well known, to provide for a cut-off of 85 to 90% piston stroke, and such an engine would exert on the crankshaft at very slow speed, a mean rotative effort of about 1.2 times the initial pressure on one piston, the same, as has been seen, as the three-cylinder 30% cut-off arrangement; obviously therefore, if, using cylinders of the same size, two engines were constructed, one with two cylinders having 87% cut-off, and the other with three cylinders having 30% cut off, each would exert approximately the same mean rotative effort when running slowly. The would differ very decidedly however in steam consumption, for the three cylinder engine would require only about 60% as much steam as the other. Moreover, due to its shorter cut-off, the three-cylinder engine could be operated at a much higher speed than the other, and, if a variable cut-off gear were fitted to the two-cylinder engine enabling a 30% cut-off to be used after starting, obviously, having an extra cylinder, the three-cylinder engine would be 50% more powerful when both are running at 30% cut-off. Such a three-cylinder engine, it is well known, cannot be used, because the low point of its starting effort is only ⅕ that of the two-cylinder, and therefore is totally unsuited to start under load as is necessary, particularly in the case of the locomotive.

To overcome this objection I have devised and shall now describe simple means for ensuring the starting under load of such a three-cylindered engine. It consists, briefly, of admitting steam to one or more of the cylinders, (depending upon the proportionate starting power desired, the relative crank angles and the cut-off used) for the purpose of this description all three, after its main valve has cut off, for a sufficient additional fraction of the stroke to accomplish the purpose, such additional steam being under the control of the main valve actuating mechanism of one of the other cylinders.

Referring again to Fig. 1, valve chamber 7 has two additional or auxiliary ports 26 and 27, opened and closed by valve 10, which communicate as seen, respectively with auxiliary ports 28 and 29 in cylinder 2. Likewise in chamber 8 valve 11 opens and closes auxiliary ports 30 and 31, which communicate with the auxiliary ports 32 and 33 respectively in cylinder 3; and valve 12 in chamber 9 opens and closes auxiliary ports 34 and 35 which connect with auxiliary ports 36 and 37 in cylinder 1. The action is as follows: With the engine standing in the position seen in this figure, the steam can reach (1) the left end of cylinder 1 via auxiliary ports 34 and 36, (2) the left end of cylinder 2 via main port 16, and (3) the right hand end of cylinder 3 by way of both main port 17 and auxiliary ports 31—33, resulting in a starting rotative effort equal to about 1.75 times the initial pressure on one piston, which is 45% more than the mean rotative effort of about 12% better than the best the two-cylinder engine can exert. If, however, the crankshaft had stopped about 10 degrees counter-clockwise of the position of Fig. 1a then, piston 4 would be slightly to the right of that shown, piston 5 would be a negligible distance to the right also, and piston 6 slightly to the left; valve 10 would be slightly to the right still holding ports closed, valve 11 slightly to the left still further opening main port 16 and auxiliary port 31, and valve 12 slightly to the left closing both main port 17 and auxiliary port 34: consequently, piston 4 is out of action piston 5 can exert a rotative effort equal to about 0.2 of the pressure of the steam upon it (which alone would not start the load) but piston 6 at this time is getting steam from auxiliary ports 31—33, and consequently can exert a rotative effort equal to about 0.98 of the total pressure upon it, making a total effort from this assumed position of 1.18 times the pressure on one piston, which is seen to be about equal to the mean rotative effort of the engine minus the effects of the auxiliary ports. This latter assumed position is about the worst that could be used, consequently, starting is at all times assured.

Fig. 2. The engine having started and the cranks turned through an arc of 60 degrees from the position of Fig. 1, the various parts occupy the positions seen in this figure wherein it is observed that the auxiliary steam being fed to the right of piston 6 is about to be cut off, and auxiliary steam is able to reach the left of piston 5 as valve 10 has commenced to open port 26.

Fig. 3. A further turn of the crank of 60 degrees produces the relative positions seen in this figure, viz, valve 12 feeds auxiliary steam to the right of piston 4 via ports 35 and 37, valve 10 is about to cut off main port 13 and auxiliary port 26 by way of which latter the left side of piston 5 has been getting steam since the position of Fig. 2. The same sequence of actions of course occur during the return stroke.

The auxiliary ports are constructed smaller than the main ports and consequently pass proportionately less steam as the speed of the engine increases, and if made small enough and the speed attained to be high enough, the steam admitted by them becomes entirely negligible and the engine continues to operate on steam supplied by the main ports only. Usually it will be found desirable to restrict the controlling area of these auxiliary passages to the least possible consistent with giving satisfactory promptness when starting, and in such cases an auxiliary port area of as small as 0.0003 of that of the piston has proved satisfactory, and when the steam passed becomes entirely negligible when the crankshaft is revolving at about 30 R. P. M.

Another feature of the arrangement of Figs. 1, 2 and 3 is that the auxiliary passages not only serve to admit steam to the various cylinders, but also become auxiliary exhaust passages, as seen in Fig. 1 where passage 32—30 is assisting to exhaust the steam from the left of piston 6 via the exhaust port in chamber 8. Additional instances are found in Figs. 2 and 3. The designer of these auxiliary ports has a wide field within practical limits, for example, Fig. 4 shows a left end auxiliary port so shaped that when properly located relative to the valve, only the small extension of the port would be uncovered to live steam as indicated by the dotted outline of the valve but the whole as shown by the full valve outline or the larger end of it would be uncovered to exhaust, thereby providing a large auxiliary exhaust means combined with a small auxiliary inlet which later will go out of action at a considerably lower speed than the exhausting ability of that port,—the valve in this figure is shown moved farther to the right than its actual extreme position in order to show the shape of the port clearly.

When it is desired that the exhaust feature of these auxiliary ports be eliminated, an arrangement such as seen in Fig. 5 may be used, in which the valve has an extension to open and close the auxiliary port, which latter is so located that the exhaust edge of the valve never uncovers it, as seen by the dotted outline of the valve in its extreme exhausting position. On the other hand, if it is desired to combine a small admission opening with an auxiliary exhausting feature extending over a very large fraction of the stroke, Fig. 6 shows a method in that direction wherein the dotted outline of the valve in its extreme position to the left permits live steam to enter the auxiliary passage by way of the smaller opening only, and the full line outline of the valve shows clearly that in its movement to the left closing the ports to exhaust action, the auxiliary port is closed later than it would be if the relative positions of the two ports were as seen in Figs. 1, 2 and 3.

Referring back to Fig. 1. Note that auxiliary port 31 connects with port 33 to the right side of piston 6. If now it were desired to operate this engine in the opposite direction, the directions of pistons 4 and 6 must be reversed, in which case, among other things, auxiliary port 31 would require to be connected to auxiliary port 37 to the right of piston 4, not to 33 as now, showing that for a reversing engine means must be provided for changing the connection of each auxiliary valve chamber port as just seen; this is effected on the well known principle of the three-way cock and there are many ways of performing same. One method is shown in connection with Fig. 7.

Fig. 7. Here is seen the essential features of a marine type engine with this device applied for running in either direction. To enable the various features of this arrangement to be clearly shown, the relative cylinder position is slightly different to Figs. 1, 2 and 3, the principle is exactly the same so the same reference numbers will be employed with the difference that, to facilitate this description, the pipe connections of Fig. 7 bear the numbers of the ports with which they respectively connect.

Variation of cut-off and reversing of this engine are accomplished in the ordinary way by manipulation of handwheel 38 attached to screw 39, when trunnion nut 40 partially rotates quadrant 41 attached to link shaft 42, thus moving the link 43. In another arm of this quadrant is formed the slot 44 carrying a sliding block 45 connected to rod 46 which, at its other end, is connected to the operating arm of selecting valve 47a, which in turn is coupled by rod 48 to a similar arm on a similar valve 47b, it is obvious that as the quadrant 41 is rotated not only is the position of link 43 changed but also that of the arms of the selector valves, and these arms again, may be moved much or little as determined by the position of block 45 in slot 44. With the quadrant in any position the position of block 45 in slot 44 is changed at will by manipulation of lever 49, pivoted at 42, which may be held in any desired position relative to the quadrant by suitable engaging means as the holes 50. As shown, the selector valves have a maximum movement—angular—and by moving lever 49 to the other end of the sector, block 45 will move to the innermost end of slot 44, thus giving to rod 46 a minimum movement.

By changing the point of attachment of rods 46 and 48, variation of angular movement of the selector valves relative either to one another or to block 45 may be attained. The function of the selector valves is here illustrated by the simple arrangement of Fig. 8. Here are seen enlarged sectional views of selector valves 47a and 47b which are attached in Fig. 7 to one of the valve chambers where the auxiliary ports leave that chamber; the central parts 51 are arranged to be partially rotated by the arms before mentioned, and, with block 45 in the position of Fig. 7, when the engine is reversed, these parts 51 each rotate through approximately 60 degrees which effects a change in connection between the various ports, and 47a would then appear as now does 47b and vice versa, then port 26 would communicate with port 32 instead of with 28 as now seen; 36 would connect with 30, and 34 with 28; likewise, in 47b, 27 would be joined by passing to 33, 31 to 37, and 35 to 29, thus automatically effecting the necessary auxiliary port changes suited to the direction in which it is desired to operate the engine. It will be noted that, as the main cut-off is shortened, so will parts 51 partially revolve, tending to cause disregistration of the passages therein with the ports in the fixed outer casing, so decreasing the available area for the steam flow until all flow is finally cut off by this movement and the engine operates with the main ports only. With the proportions seen in Fig. 8, it is obvious that this mechanical auxiliary port cut out will be complete with less angular movement—consequently with less main cut-off shortening—than would be the case if the passages were constructed wider as seen dotted between ports 31 and 33 in 47b of Fig. 8: also, if desired, the auxiliary ports may be cut out completely with the engine still in full gear, by moving lever 49 to its opposite extreme position: and intermediate positions of this lever varies the point of auxiliary port cut out relative to main valve cut-off. Furthermore, as the steam passed by the auxiliary ports tends to give additional power during running, it is obvious that, without change of main cut-off, the power of the engine may be increased much or little within the limits of speed at which the auxiliary ports are effective, by manipulation of lever 49, so enabling the operator to meet changes in power requirements, higher than is possible with the main valve cut-off as set, as they may occur.

Fig. 9 illustrates a fitting which embodies a principle that may be desirable in certain circumstances, such as the wish to make 47a and 47b suited to different sizes of engine necessitating differing sizes of auxiliary ports; 52 is a body having a removable gauging piece 53—for which may be substituted a similar piece having a different passage area—plug 54 providing a ready means of inspection and exchange. This body may be location in any desired position such as exemplified in Fig. 7.

This invention is illustrated in connection with a piston valve construction although it is obvious that it can be used in other forms of valves. Likewise, although a three-cylinder double-acting engine having 30% maximum cut-off is preferred for the purpose of this disclosure, it is also obvious that this invention can be used in engines having other numbers and types of cylinders employing other maximum cut-offs, the which it is unnecessary to illustrate here. Furthermore, it is to be understood that, while I have herein shown and described several preferred embodiments of this invention, the same is nevertheless susceptible of many minor modifications in the form, proportion, and relative arrangement of the several parts, and I accordingly reserve the privilege of adopting all such legitimate changes as may be fairly embodied within the spirit and scope of the invention as claimed.

What I claim is:—

1. A steam engine, including, a plurality of cylinders, each cylinder having, a valve chamber, a main port connecting said chamber with the cylinder bore, an auxiliary port connecting said chamber with the bore of another cylinder, a valve in said chamber for controlling said main port and for also controlling both admission and cut-off at said auxiliary port, and means for actuating said valve.

2. A steam engine, including, a plurality of cylinders, each cylinder having, a valve chamber, a main port connecting said chamber with the cylinder bore, an auxiliary port connecting said chamber with the bore of another cylinder, a valve in said chamber for controlling said main port and for also controlling both admission and cut-off at said auxiliary port, means for actuating said valve, and means—independent of said valve and its actuating means—for varying the amount of steam passed by said auxiliary port.

3. A steam engine, including, a plurality of cylinders, each cylinder having, a valve chamber, a main port connecting said chamber with the cylinder bore, an auxiliary port connecting said chamber with the bore of another cylinder, a valve in said chamber for controlling said main port and for also controlling both admission and cut-off at said auxiliary port, means for actuating said valve, means for varying the cut-off at the main port and for automatically varying the cut-off at the auxiliary port as the cut-off at the main port is varied.

4. A steam engine, including, a plurality of cylinders each cylinder having, a valve chamber, a main port connecting said chamber with the cylinder bore, an auxiliary port connecting said chamber with the bore of another cylinder, a valve in said chamber for controlling said main port and for also controlling both admission and cut-off at said auxiliary port, means for actuating said valve, means for shortening the cut-off at the main port and for automatically cutting off the supply of steam by way of said auxiliary port when the cut-off at the main port is shortened a predetermined amount.

5. A steam engine, including, a plurality of cylinders each cylinder having a valve chamber, a main port connecting said chamber with the cylinder bore, an auxiliary port connecting said chamber with the bore of another cylinder, a valve in said chamber for controlling said main port and for also controlling both admission and cut-off at said auxiliary port, means for actuating said valve, means for varying the cut-off at the main port and for automatically cutting off the supply of steam by way of said auxiliary port when the cut-off at the main port is shortened a predetermined amount, and means for cutting off the supply of steam by way of said auxiliary port regardless of the cut-off set for the main port.

6. A steam engine, including, a first cylinder a second cylinder and a third cylinder, each cylinder having a main port, a control valve for said main port and means for operating said control valve, an auxiliary port leading from the control valve of said first cylinder to the bore of said second cylinder, admission and cut-off at said auxiliary port being controlled by the control valve of said first cylinder; an auxiliary port leading from the control valve of said second cylinder to the bore of said third cylinder, admission and cut-off at said last mentioned auxiliary port being controlled by the control valve of said second cylinder; and an auxiliary port leading from the control valve of said third cylinder to the bore of said first cylinder, admission and cut-off at said last mentioned auxiliary port being controlled by the control valve of said third cylinder.

7. A steam engine, including, a first cylinder, a second cylinder and a third cylinder, each cylinder having a main port a control valve for said main port and means for operating said control valve, an auxiliary port leading from, and suitably located relative to, the control valve of said first cylinder to the bore of said second cylinder, admission cut-off and exhaust at said auxiliary port being controlled by the control valve of said first cylinder; an auxiliary port leading from, and suitably located relative to, the control valve of said second cylinder to the bore of said third cylinder, admission cut-off and exhaust at said last mentioned auxiliary port being controlled by the control valve of said second cylinder; an auxiliary port leading from, and suitably located relative to, the control valve of said third cylinder to the bore of said first cylinder, admission cut-off and exhaust at said last mentioned auxiliary port being controlled by the control valve of said third cylinder.

8. A structure as specified in claim 7 wherein the area of the auxiliary parts available for the entry of steam to the cylinders is unequal to the area available for the exit of steam by way of said auxiliary ports from the cylinders.

9. A steam engine including a first cylinder, a second cylinder and a third cylinder each having main and auxiliary ports for the passage of steam, controlling means for the main port of said first cylinder adapted to also control the auxiliary port of said second cylinder when the engine is running forward and the auxiliary port of said third cylinder when the engine is running backward, controlling means for the main port of said second cylinder adapted to also control the auxiliary port of said third cylinder when the engine is running forward and the auxiliary port of said first cylinder when the engine is running backward, controlling means for the main port of said third cylinder adapted to also control the auxiliary port of said first cylinder when the engine is running forward and the auxiliary port of said second cylinder when the engine is running backward, means for determining the direction in which the engine shall operate, and means for establishing connection between each main port controlling means and the proper auxiliary port it must control according to the direction in which the engine is set to run.

10. A steam engine, including, three cylinders each having a main port a control valve for same and means for operating said valve, each cylinder having also an auxiliary port leading from its control valve to the bore of one of the other cylinders, admission and cut-off at said auxiliary port being effected by said last mentioned control valve.

11. A steam engine, including, three cylinders each having a valve chamber, a main port connecting said chamber with the cylinder bore, an auxiliary port connecting said chamber with the bore of another cylinder, a slidable valve in said chamber adapted to effect both admission and cut-off at said main and at said auxiliary ports, and means for operating said valve.

12. A steam engine, including, three cylinders each cylinder having a valve chamber, a main port connecting said chamber with the cylinder bore, an auxiliary port connecting said chamber with the bore of another cylinder, a slidable valve in said chamber adapted to effect both admission and cut-off at said main and at said auxiliary ports, means for operating said valve and means for varying the amount of steam admitted to the cylinder by way of said auxiliary port at the will of the operator.

13. A steam engine, including, three cylinders each cylinder having a valve chamber, a main port connecting said chamber with the cylinder bore, an auxiliary port connecting said chamber with the bore of another cylinder, a slidable valve in said chamber adapted to effect both admission and cut-off at both said main and auxiliary ports, means for operating said valve, and means for reducing the admission of steam to the cylinder by way of said auxiliary port to zero.

14. A steam engine, including, three cylinders each cylinder having a valve chamber, a main port connecting said chamber with the cylinder bore, an auxiliary port connecting said chamber with the bore of another cylinder, a slidable valve in said chamber adapted to effect both admission and cut-off at both said main and auxiliary ports, and means for varying the cut-off at both said main and auxiliary ports.

15. A steam engine, including, three cylinders each cylinder having a valve chamber, a main port connecting said chamber with the cylinder bore, an auxiliary port connecting said chamber with the bore of another cylinder, a slidable valve in said chamber adapted to effect both admission and cut-off at said main and auxiliary ports, means for operating said valve, means for varying the cut-off at the main port, and means for automatically reducing the admission of steam to the cylinder by way of said auxiliary port to zero when the cut-off at the main port is shortened a predetermined amount.

16. A steam engine, including, three cylinders each cylinder having a valve chamber, a main port connecting said chamber with the cylinder bore, an auxiliary port connecting said chamber with the bore of another cylinder, a slidable valve in said chamber adapted to effect both admission and cut-off at said main and auxiliary ports, means for operating said valve, means for varying the cut-off at the main port and for automatically decreasing the amount of steam admitted to the cylinder by way of said auxiliary port as the cut-off at the main port is shortened, and means for cutting off all supply of steam to the cylinder by way of said auxiliary port regardless of the cut-off set for the main port.

17. A steam engine, including, three cylinders, each cylinder having a valve chamber, a main port connecting said chamber with the cylinder bore, an auxiliary port connecting said chamber with the bore of another cylinder, a slidable valve in said chamber adapted to effect both admission and cut-off at said main and said auxiliary ports, means for operating said valve, means for shortening the cut-off at the main port, means for automatically reducing the admission of steam to the cylinder by way of said auxiliary port to zero when the cut-off at the main port is shortened a predetermined amount, and means for varying said predetermined amount while the engine is operating.

RONALD FRANK KNIGHT.